May 16, 1939.   C. R. MANNING   2,158,879
LUBRICATING DEVICE
Original Filed March 28, 1934
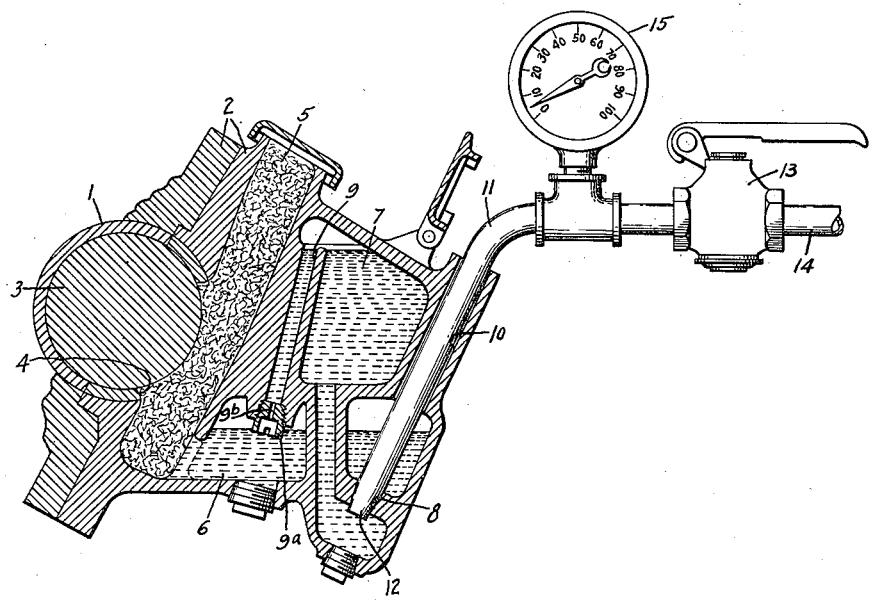
Inventor:
Charles R. Manning,
by Harry E. Dunham
His Attorney.

Patented May 16, 1939

2,158,879

UNITED STATES PATENT OFFICE 2,158,879

LUBRICATING DEVICE

Charles R. Manning, Erie, Pa., assignor to General Electric Company, a corporation of New York Application March 28, 1934, Serial No. 717,770
Renewed December 21, 1938

5 Claims. (Cl. 308—126)

My invention relates to oil reservoir bearing lubricating devices of the type employing a storage reservoir in which oil is contained below atmospheric pressure above an outlet opening, and from which the flow of oil is regulated by controlling the admission of air to the upper portion of the reservoir.

In filling the reservoir of a lubricating device of this kind, it is necessary to conduct the oil to the reservoir at a pressure greater than atmospheric pressure and to provide a vent for allowing air within the reservoir to be discharged. In filling the reservoir, it is important that the quantity of lubricant placed in the reservoir be sufficiently limited in amount to avoid overflow of the reservoir and flooding of the bearing.

An object of my invention is to provide a lubricating device of the character above set forth having an arrangement responsive to the rate of flow of lubricant through a restricted vent in the reservoir during filling of the same for indicating the level of lubricant within the reservoir.

Further objects and advantages of my invention will become apparent as the following description proceeds and the features of novelty which characterize my invention will be pointed out with particularity in the claims annexed to and forming a part of this specification.

For a better understanding of my invention reference may be had to the accompanying drawing in which the single figure is a sectional view of a lubricating device embodying my invention with a filling tube inserted therein.

Referring to the drawing, I have shown a lubricating device embodying my invention arranged to feed lubricant to a bearing 1 mounted on a bearing housing 2, a fragment of which is illustrated, and having a shaft 3 journaled therein. An opening 4 is arranged at the lower side of the bearing housing, and absorbent material 5 arranged in contact with the shaft 3 at this opening feeds lubricant from a chamber 6 in the lower end of the bearing housing 2 to the bearing 1.

Lubricant is fed to the chamber 6 from a reservoir 7 through an opening 8 at the lower end of the reservoir after removal of the filling tube 11. The upper end of the reservoir is sealed and is adapted to contain air at less than atmospheric pressure. A vent 9 having its upper end near the top of reservoir 7 and having its lower end at the desired level of lubricant in the chamber 6, controls the flow of lubricant from the reservoir. As soon as the level of the lubricant drops below the end of the vent, air is admitted through the vent to the top of the reservoir, and the resulting increase in pressure causes a flow of lubricant from the reservoir to the chamber through the opening 8. This flow continues until the lower end 9a of the vent is again submerged in the lubricant. In order to adjust the level of the lubricant in chamber 6, I prefer to connect a fitting 9a having a restricted passage 9b therein to the lower end of the vent. The position of the fitting 9a is adjusted by threading the fitting into the lower end of the vent.

In order to fill the reservoir 7 and at the same time to prevent the flow of lubricant from the reservoir 7 to the chamber 6, I provide an opening 10 in the bearing housing through which a filling tube 11 may be inserted. The lower end or tip 12 of the filling tube is tapered and conforms to the shape of the opening 8 so that when the tube is in place, the opening 8 is effectively sealed. The opening 10 in the bearing housing is somewhat larger than the tube 11 so that the chamber 6 is vented to the atmosphere during the filling operation. The tube 11 is connected to a source of lubricant under pressure through a control valve 13 and tube 14.

In lubricating devices of this type, if an excess of lubricant is fed to the reservoir, the excess overflows through the vent and causes the bearing to flood. In accordance with my invention, I provide a restricted passage 9b in the vent so that when the lubricant in the reservoir overflows through the vent, the resistance offered to the flow of lubricant through the restricted passage causes an increase in pressure in the filling tube 11. A pressure gauge 15 is placed in the filling tube 11 between the control valve 13 and the tip 12 and indicates to the operator by the increase in pressure that the lubricant in the reservoir is at the desired level.

In order to fill the reservoir 7, the tip 12 of the tube 11 is inserted in the opening 8. The valve 13 is then operated to admit lubricant under pressure to the tube 11. Lubricant will be forced into the reservoir 7, and the air within the reservoir will be exhausted through the passage 9b in the vent so long as the level of the lubricant in the reservoir is below the upper end of the vent 9. As soon as the level of the lubricant rises above the upper end of the vent, lubricant will flow through the vent and the increased resistance offered to the flow of lubricant through the restricted passage 9b will cause a decreased rate of flow of lubricant and the resulting increase of pressure will be registered on the gauge. This increase in pressure indicates to the operator that the level of lubricant in the reservoir is at the upper end of the vent 9 and that the valve 13 should then be operated to cut off the flow of lubricant. By this arrangement, it is possible to prevent an excess of lubricant in the reservoir which would flow through the vent and flood the bearing.

Although I have shown a particular embodiment of my invention, I do not desire to be limited to the construction described, and I intend in the appended claims to cover all modifications which do not depart from the spirit and scope of my invention.

What I claim as new and desire to secure by Letters Patent of the United States, is:

1. A lubricating device for a bearing comprising a storage reservoir adapted to contain lubricant below atmospheric pressure, an outlet from said reservoir for supplying lubricant to a chamber feeding lubricant to said bearing, means for supplying lubricant under pressure to said storage reservoir, means for preventing substantial flow of lubricant from said reservoir to said chamber during filling, said reservoir having an upwardly extending vent passage communicating at the upper end thereof with the upper portion of said reservoir above the normal level of lubricant therein and communicating with said feeding chamber at the lower end thereof, the lower end of said vent passage opening at the normal level of lubricant in said feeding chamber and thereby controlling the admission of air to said reservoir and the flow of lubricant therefrom, said vent passage providing for the escape of air from said reservoir during filling and being sufficiently restricted to cause a rise in pressure in said reservoir upon the flow of lubricant through said restriction during the filling of said reservoir, and means responsive to the rise in pressure in said reservoir upon the flow of lubricant through said restricted passage during filling for indicating the level of lubricant in said reservoir during filling the same.

2. A lubricating device for a bearing comprising a storage reservoir adapted to contain lubricant below atmospheric pressure, an outlet from said reservoir for supplying lubricant to a chamber feeding lubricant to said bearing, means supplying lubricant under pressure to said reservoir for filling said reservoir, means for preventing substantial flow of lubricant from said reservoir to said chamber during filling, said reservoir having an upwardly extending vent passage communicating at the upper end thereof with the upper portion of said reservoir above the normal level of lubricant therein and communicating with said feeding chamber at the lower end thereof, the lower end of said vent passage opening at the normal level of lubricant in said feeding chamber and thereby controlling the admission of air to said reservoir and the flow of lubricant therefrom, said vent passage providing for the escape of air from said reservoir during filling and being sufficiently restricted to cause a rise in pressure in said reservoir upon the flow of lubricant through said restriction during the filling of said reservoir, and means responsive to the pressure created during filling by the flow of lubricant through said restricted passage for indicating the level of lubricant in said storage reservoir.

3. A lubricating device for a bearing comprising a storage reservoir adapted to contain lubricant below atmospheric pressure, an outlet from said reservoir for supplying lubricant to a chamber feeding lubricant to said bearing, said outlet being arranged to provide for introducing a filling tube into said outlet to direct lubricant into said reservoir and to prevent the flow of lubricant to said chamber from said outlet during filling, means for supplying lubricant under pressure through said filling tube, said reservoir having an upwardly extending vent passage communicating at the upper end thereof with the upper portion of said reservoir above the normal level of lubricant therein and communicating with said feeding chamber at the lower end thereof, the lower end of said vent passage opening at the normal level of lubricant in said feeding chamber and thereby controlling the admission of air to said reservoir and the flow of lubricant therefrom, said vent passage providing for the escape of air from said reservoir during filling and being sufficiently restricted to cause a rise in pressure in said reservoir upon the flow of lubricant through said restriction during the filling of said reservoir, and means responsive to the pressure created during filling by the flow of lubricant through said restricted passage for indicating the level of lubricant in said storage reservoir.

4. A lubricating device for a bearing comprising a storage reservoir adapted to contain lubricant below atmospheric pressure, an outlet from said reservoir for supplying lubricant to a chamber feeding lubricant to said bearing, means supplying lubricant under pressure to said reservoir for filling said reservoir, said reservoir having an upwardly extending vent passage communicating at the upper end thereof with the upper portion of said reservoir above the normal level of lubricant therein and communicating with said feeding chamber at the lower end thereof, the lower end of said vent passage opening at the normal level of lubricant in said feeding chamber and thereby controlling the admission of air to said reservoir and the flow of lubricant therefrom, said vent passage providing for the escape of air from said reservoir during filling and being sufficiently restricted to cause a rise in pressure in said reservoir upon the flow of lubricant through said restriction during the filling of said reservoir, and means including a pressure gage associated wtih said lubricant supply means and responsive to the pressure created during filling by the flow of lubricant through said restricted vent for indicating the level of lubricant in said storage reservoir during filling the same.

5. A lubricating device for a bearing comprising a storage reservoir adapted to contain lubricant below atmospheric pressure, an outlet from said reservoir for supplying lubricant to a chamber feeding lubricant to said bearing, said outlet being arranged to provide for introducing a filling tube into said outlet to direct lubricant into said reservoir and to prevent the flow of lubricant to said chamber from said outlet during filling, said reservoir having an upwardly extending vent passage for conducting air from said reservoir during filling and air from said chamber to said reservoir when the lubricant in said chamber is at a level lower than said vent passage, said vent passage having a fitting secured at the lower end thereof and having a passage therein communicating with said chamber, said passage in said fitting providing for the escape of air from said reservoir and being sufficiently restricted with respect to the size of said vent to cause a rise in pressure in said reservoir upon the flow of lubricant through said passage from said reservoir during filling, means for supplying lubricant under pressure through the filling tube to said reservoir, and means responsive to the pressure created by the flow of lubricant through said restricted vent for indicating the level of lubricant in said storage reservoir during filling the same.

CHARLES R. MANNING.